3,275,681
CATALYTIC SYSTEM FOR THE ADDITION
OF BISULFITES TO OLEFINS
William S. Emerson, Lexington, Richard N. Macnair, Cambridge, and Chi-Hua Wang, Lexington, Mass., assignors to Arthur D. Little, Inc., Cambridge, Mass., a corporation of Massachusetts
No Drawing. Filed May 20, 1963, Ser. No. 281,797
2 Claims. (Cl. 260—513)

This invention relates to a new and improved catalytic system for the promotion of reactions between bisulfite ion and an olefin to form alkylsulfonic acids and their salts.

The reaction $$RCH=CH_2 + HSO_3^- \rightarrow RCH_2CH_2SO_3^-$$

is known, but none of the synthesis routes to the product, particularly to long straight chain aliphatic sulfonic acids or to alkylsulfonic acids in general have been adaptable to commercial production.

One prior art method of adding bisulfite to 1-olefins of the structure $RCH=CH_2$ discloses carrying out the reaction in any oxygen atmosphere of pressures ranging between 15 and 40 pounds p.s.i.g. to obtain yields from 15% to 90%. Another prior art method carries out the reaction between ammonium bisulfite and an excess of olefin in the presence of sodium nitrite and sodium nitrate to obtain yields of about 20% of theoretical. Finally, U.S.P. 2,398,426 discloses a similar addition reaction of ammonium bisulfite to olefins under elevated pressures and temperatures, e.g., 400 atmospheres and 120° C. using 2,2-bis(t-butylperoxide)butane as a catalyst. Yields by this process were stated to be as high as 96%.

None of these prior art methods has been satisfactory as a commercial synthesis route for one or more reasons. The need for high pressures and temperatures in some of these syntheses requires large capital outlay for equipment; while the use of a pressurized gaseous reaction atmosphere requires special equipment and raise problems in the manufacture of a material which is by nature a detergent and which is therefore subject to foaming in the presence of gas capable of extending it. Finally, many of the prior art processes have not been able to achieve yields which make them attractive to commercialization.

Compounds of the general formula $RCH_2CH_2SO_3H$ and their salts are known to be effective detergents, textile softening agents, emulsifying agents, and the like. However, it is in the detergent field that they offer the most interesting possibility since they are stable under all pH's and particularly stable toward acidic conditions due to the fact that the sulfur atom is attached directly to the carbon chain. Even more important, however, is the fact that the presence of the long straight aliphatic chain makes these materials biodegradable. This latter characteristic is of particular importance in view of the fact that it has now become a worldwide problem to develop detergents which can be removed from sewage. At the present time, many of the detergents used are aromatic sulfonates which are not biodegradable—at least no biological bodies are known at present which are capable of degrading these detergents to remove them in subsequent water repurification processes.

The method of this invention may be briefly described as adding the bisulfite ion to olefinic compounds at room temperature in the presence of a catalyst which may be defined as comprising a peroxide and an organometal salt, the metal of which is capable of undergoing a change in valence state by single electron transfer process.

The invention, accordingly, comprises the several steps and the relation of one or more of such steps with respect to each of the others thereof, which will be exemplified in the method hereinafter disclosed, and the scope of the invention will be indicated in the claims.

It is a primary object of this invention to provide a new and improved catalytic system for the promotion of the reaction between a bisulfite ion and an olefin. It is another object of this invention to provide an improved catalytic system of the character described which is capable of catalyzing the reaction at room temperatures and ambient pressures. It is yet another object to provide such a catalytic system which is capable of effecting the reaction indicated in a continuous process to obtain an overall good yield. It is yet another object to provide such a catalytic ssytem which permits the reaction to be carried out without any attendant complications, and in standard equipment which does not require the outlay of large amounts of capital or the design of special apparatus.

It is another primary object of this invention to make available on a commercial scale alkylsulfonic acids and their salts which are particularly well suited as detergents, the detergents being biodegradable. Other objects of the invention will in part be obvious and will in part be apparent hereinafter.

The addition of bisulfite to olefins through free radical exchange has been well established to involve the following chain process (J. Org. Chem. 3 175 (1938)):

$$HSO_3^- + R \cdot \longrightarrow \cdot SO_3^- + RH$$
$$\cdot SO_3^- + RCH=CH_2 \longrightarrow RCH-CH_2SO_3^-$$
$$RCH-CH_2SO_3^- + HSO_3^- \longrightarrow RCH_2CH_2SO_3^- + \cdot SO_3^-$$

By the method of this invention the process is catalyzed by a redox system which can be expressed generally as $$M^{++} + ROOR \rightarrow M^{+++} + OR^- + \cdot OR$$

where M is a metal and R is a suitable group defined below.

The reaction is carried out in a liquid medium and at temperatures which may range from as low as $-10°$ C. to room temperature or above. It is, moreover, adaptable to a continuous process operation in which the product is removed as formed and the unreacted components returned for further reaction in the presence of fresh catalyst. Thus, yields over a period of time may be kept high without resorting to undersirable reaction conditions such as extremely high temperatures and pressures or the use of a gas which would cause the product to foam.

The olefin component to which the bisulfite is added may be generally defined as one having the formula $$R-\overset{H}{\underset{|}{C}}=\overset{H}{\underset{|}{C}}-R$$

the one restriction on R being that it does not result in an olefinic compound which is conjugated with a heterounsaturated group such as $C=O$, cyano and the like. Thus, R may be hydrogen, alkyl, substituted alkyl, or part of an unconjugated cyclic grouping. The substituent on the alkyls may be halogens, aryl groups, and the like. Where R is alkyl the carbon chain may be any length required to give the final alkylsulfonic acid or salt the properties desired of it. Thus, propene, butene, isoprene, octene, dodecene, as well as the alkyl groups formed of very long carbon chains are all suitable since steric hindrance is not a problem, and the reactive site is not influenced by the length of the R chain. 4-phenyl-1-butene may be cited as an example of an aryl-substituted alkyl olefin and cyclohexene as an example where the $>C=C<$ grouping is part of a cyclic structure.

The source of the bisulfite ion should be the salt of a strong base since at ambient conditions the use of a salt of a weak base would lead to an undesirable amount of hydrolysis. The alkali metal bisulfites are the most suitable, with sodium bisulfite being generally preferred.

The liquid medium in which the reatcion is carried out and which contains the catalytic system is a mixture of water and a water-miscible organic liquid which is a solvent for the olefin. The inorganic bisulfites are soluble in the water portion and the olefins in the organic solvent which means that at the beginning of the reaction there is actually a two-phase system. The ratio of water to organic solvent is not critical so long as there is sufficient quantities of both liquids to dissolve the bisulfite and olefin reactants.

The water-miscible organic solvents include, but are not limited to, the lower aliphatic alcohols (methyl, ethyl, n-propyl and isopropyl) tetrahydrofuran, dimethylformamide and the like.

In the catalytic system the peroxide, represented by the general formula R′O—OR″ is a peroxide which is soluble in the oil phase of the reaction medium. R′ and R″ may be hydrogen, acyl, alkyl, aryl-alkyl or aroyl. Both R′ and R″ may not, however, be hydrogen, thus eliminating hydrogen peroxide. Acetyl peroxide is an example of a suitable peroxide in which R′ and R″ are acyl; tertiary butyl hydroperoxide of a peroxide where R′ is alkyl and R″ hydrogen; cumene hydroperoxide where R′ is an aryl-alkyl and R″ is hydrogen; and benzoyl peroxide where R′ and R″ are both aroyl. Suitably substituted peroxides may also be used—for example, p,p′chlorobenzoyl peroxide is typical of a substituted diaroyl peroxide.

The organometal portion of the catalytic system may be defined as a metal organic in which the metal is one which is capable of undergoing a change in valence state by a single electron transfer process. This catalyst component should be soluble in the organic phase of the reaction medium. Among the metals which meet this requirement are the transition metals including iron, manganese, titanium, vanadium, cobalt, nickel and the like. Among the organometal salts which have been found to be particularly useful in the catalytic system of this invention may be listed ferrocene (dicyclopentadienyl iron) cobaltocene (dicyclopentadienyl cobalt), the metal naphthenates, and the β-diketone chelates of the transition metals. The manganese, vanadium, cobalt, and iron salts of acetyl acetonate are examples of the last-named type of organometal compounds.

In carrying out the reaction between the inorganic bisulfite and olefin the reactants may be employed in the stoichiometric ratio of one mole of bisulfite to one mole of olefin. An excess of either reactant is not detrimental, but it is preferable to use an excess of the inorganic bisulfite if stoichiometric quantities are not used.

The amount of the components making up the catalytic system may be conveniently expressed as mol percent of the olefin reactant. Peroxide and organometallic salt concentrations above about 0.25 mol percent of the olefin do not enhance the rate of reactions or percent yield.

The use of peroxide and organometallic salt concentrations much below 0.2 mol percent of the olefin result in low yields, probably because of the difficulties inherent in thoroughly and uniformly mixing such small quantities throughout the liquid reaction medium.

Although there is nothing critical in the manner in which the reactants and catalytic system are mixed, the bisulfite is preferably dissolved in water, the olefin in the organic solvent, and the peroxide and organometallic salt making up the catalytic system in the organic phase. The two phases are then mixed thoroughly and stirred for that period of time required to give the yield desired. In a batch process this may be a day or two, while in a continuous process the mixing and continual addition of fresh catalyst and withdrawal of product can be carried out.

The product formed by the reaction is, of course, a salt, the cation of which is the cation of the inorganic bisulfite reactant. This salt is normally soluble in water, and must therefore be isolated. This may be done by removing the liquid reaction medium by well-known techniques such as distillation at reduced pressures, or by spray drying. The salt may be precipitated as an insoluble salt such as the lead salt by adding lead acetate to the solution for example. The free alkylsulfonic acids may be isolated but they are extremely hygroscopic. This may be done by acidifying the liquid reaction medium, concentrating it under reduced pressure and extracting the alkylsulfonic acids with isopropyl alcohol.

The process of this invention may be further described with reference to the following examples which are meant to be illustrative and not limiting.

A number of olefins were caused to react with inorganic bisulfites using various catalytic systems. The specific data on these are tabulated below. In carrying out these reactions the bisulfite and olefin were stirred into a water/methanol liquid reaction medium which was a mixture of 30 ml. water and 300 ml. methanol and which contained the peroxide and organometallic salt as the catalyst system. The mixture was stirred at room temperature for a period of from one to several days. The solvent was then removed at reduced pressure (e.g., 30 mm.) to leave the sodium salt which was an oily solid residue. Quantitative isolation was carried out on a portion of each product by acidifying the water solution of the sodium alkylsulfonate and precipitating the sulfonic acid as its lead salt by the addition of lead acetate.

| Example No. | Olefin | Bisulfite | Catalytic System | | Yield, percent |
|---|---|---|---|---|---|
| | | | Peroxide | Organometallic Compound | |
| 1 | 1-octene (0.2)[1] | Sodium (0.24) | Dibenzoyl (0.04) | Mn salt of acetyl acetonate (0.04) | 20 |
| 2 | Cyclohexene (0.24) | Sodium (.19) | ------do------ | ------do------ | 56 |
| 3 | 1-octene (0.2) | Sodium (.29) | ------do------ | Dicyclopentadienyl iron (0.05) | 25 |
| 4 | 1-hexadecene (0.1) | Sodium (0.14) | ------do------ | Mn salt of acetyl acetonate (0.04) | 17 |
| 5 | 1-dodecene (0.2) | Ammonium (0.24) | Cumene hydroperoxide (0.04) | Dicyclopentadienyl iron (0.05) | Trace |
| 6 | 1-octene (0.2) | Sodium (0.29) | | | 0 |
| 7 | ------do------ | Ammonium (.21) | Cumene hydroperoxide (0.24) | Ferrous sulfate (0.10) | 0 |

[1] Numbers in ( ) are mols of reactant or catalyst.

It will be seen from the examples which are tabulated above that the method of adding a bisulfite ion to olefins is applicable to those olefins wherein the R of the olefinic structure represented by

may be alkyl of varying length, or the C=C grouping may be present in a cyclic unconjugated structure such as in cyclohexene. These data also illustrate the use of various peroxides and metalorgano compounds which meet the requirements stated above.

Examples 6 and 7 are controls, 6 showing that no reaction takes place between an olefin and a bisulfite in the absence of a catalytic system and 7 illustrates the ineffectiveness of the catalytic system when the metal ion is present as a water-soluble inorganic salt.

Finally, Example 4 illustrates the fact that when the alkyl portion of the olefin is extremely long (in this case a carbon chain of 16 carbon atoms) the yields are not as high as in the case of octene for example. This is apparently due to the fact that the olefins having the longer carbon chains are less soluble in the water-miscible organic liquid and hence a smaller amount of the olefin is available for reaction. These smaller yields may be overcome at least to some extent by suitable choice of solvent, and the use of more dilute solutions.

It will be seen from the above description of the method of this invention and from the examples that there is provided a novel catalytic system which permits the addition of bisulfite ions to olefins at room temperatures. Since the reaction does not require elevated temperatures or pressures, nor the use of gaseous atmospheres (e.g., oxygen) it is possible to efficiently and economically form alkylsulfonic acids and their derivatives either by a batch or continuous process.

It will thus be seen that the objects set forth, among those made is apparent from the preceding description are efficiently attained and since certain changes may be made in carrying out the above method without departing from the scope of the invention, it is intended that all matter contained in the above description shall be interpreted as illustrative and not in a limiting sense.

We claim:
1. A method of adding the bisulfite ion to an olefin, consisting essentially of the step of reacting an inorganic alkali-metal bisulfite dissolved in an aqueous liquid with an olefin of the formula $R-CH=CH_2$, wherein R is alkyl, dissolved in a water-miscible organic liquid; said reacting being in the presence of a catalytic system insoluble in water and soluble in said organic liquid, said catalytic system consisting essentially of an organic peroxide of the formula $R'O-OR''$, wherein $R'$ and $R''$ are selected from the group consisting of hydrogen, acyl, alkyl, and aryl-alkyl, and a water-insoluble organometallic compound of a transition metal M which is a $\beta$-diketone chelate of said metal or a dicyclopentadienyl of said metal, whereby said catalytic system gives rise to a reaction generally expressed as

$$M^{++} + R'O-OR'' \rightarrow M^{+++} + \cdot OR' + OR''^{-}$$

2. A method of reacting an inorganic bisulfite with an olefin thereby to effect the addition of a bisulfite ion to an olefin, consisting essentially of the steps of
 (a) dissolving an alkali metal bisulfite in water to form a first phase;
 (b) at least partially dissolving an olefin of the formula $R-CH=CH_2$ wherein R is alkyl, in a water-miscible organic liquid to form a second phase;
 (c) mixing at room temperature said first and second phases in the presence of a catalytic system soluble in said second phase and consisting essentially of dibenzoyl peroxide and dicyclopentadienyl iron or a manganese salt of acetyl acetonate; and
 (d) isolating the resulting olefinic bisulfite.

References Cited by the Examiner

UNITED STATES PATENTS 2,318,036  4/1943  Werntz _____ 260—513

FOREIGN PATENTS 1,087,994  3/1955  France.

OTHER REFERENCES

Kharasch et al.: J. Org. Chem., vol. 15, 1950, pp. 763–774.

Kharasch et al.: J. Am. Chem. Soc., vol. 81, 1959, pp. 5819–5824.

LORRAINE A. WEINBERGER, *Primary Examiner.*
LEON ZITVER, B. M. EISEN, M. WEBSTER,
*Examiners.*